(12) United States Patent
Saykally et al.

(10) Patent No.: US 8,372,374 B2
(45) Date of Patent: Feb. 12, 2013

(54) METHOD AND APPARATUS FOR ELECTROKINETIC CO-GENERATION OF HYDROGEN AND ELECTRIC POWER FROM LIQUID WATER MICROJETS

(75) Inventors: Richard J. Saykally, Piedmont, CA (US); Andrew M. Duffin, Oakland, CA (US); Kevin R. Wilson, Oakland, CA (US); Bruce S. Rude, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 742 days.

(21) Appl. No.: 12/529,884

(22) PCT Filed: Mar. 5, 2008

(86) PCT No.: PCT/US2008/055924
§ 371 (c)(1),
(2), (4) Date: Sep. 18, 2009

(87) PCT Pub. No.: WO2008/127802
PCT Pub. Date: Oct. 23, 2008

(65) Prior Publication Data
US 2010/0101934 A1    Apr. 29, 2010

Related U.S. Application Data

(60) Provisional application No. 60/893,182, filed on Mar. 6, 2007.

(51) Int. Cl.
*C01B 3/00* (2006.01)
(52) U.S. Cl. .............. 423/644; 204/157.52; 423/184.04
(58) Field of Classification Search .................. 423/644; 204/157.52; 422/186.04
See application file for complete search history.

(56) References Cited

U.S. PATENT DOCUMENTS
5,928,505 A    7/1999    Inakagata et al.
(Continued)

FOREIGN PATENT DOCUMENTS
CA    24367304    8/2003
WO    WO 2006003328 A1 *    1/2006

OTHER PUBLICATIONS

Duffin et al., "Electrokinetic Hydrogen Generation from Liquid Water Microjets," Journal of Physical Chemistry C, vol. 111, No. 32, pp. 12031-12037, (2007).
(Continued)

*Primary Examiner* — Nicholas A. Smith
(74) *Attorney, Agent, or Firm* — Stuart B. Chinn; Lawrence Berkeley; National Laboratory (57) ABSTRACT

A method and apparatus for producing both a gas and electrical power from a flowing liquid, the method comprising: a) providing a source liquid containing ions that when neutralized form a gas; b) providing a velocity to the source liquid relative to a solid material to form a charged liquid microjet, which subsequently breaks up into a droplet spay, the solid material forming a liquid-solid interface; and c) supplying electrons to the charged liquid by contacting a spray stream of the charged liquid with an electron source. In one embodiment, where the liquid is water, hydrogen gas is formed and a streaming current is generated.

The apparatus comprises a source of pressurized liquid, a microjet nozzle, a conduit for delivering said liquid to said microjet nozzle, and a conductive metal target sufficiently spaced from said nozzle such that the jet stream produced by said microjet is discontinuous at said target. In one arrangement, with the metal nozzle and target electrically connected to ground, both hydrogen gas and a streaming current are generated at the target as it is impinged by the streaming, liquid spray microjet.

33 Claims, 6 Drawing Sheets

U.S. PATENT DOCUMENTS

| | | | |
|---|---|---|---|
| 7,799,468 B2 * | 9/2010 | Watakabe et al. | 429/314 |
| 8,083,904 B2 * | 12/2011 | Mofakhami | 204/155 |
| 2004/0192044 A1 | 9/2004 | Degertekin et al. | |
| 2005/0183962 A1 | 8/2005 | Oakes | |
| 2008/0302670 A1 * | 12/2008 | Boyle | 205/465 |

OTHER PUBLICATIONS

Duffin et al., "Electrokinetic Power Generation from Liquid Water Microjets," Journal of Physical Chemistry C, vol. 112, No. 43, pp. 17018-17022, (2008).

Yang et al., "Electrokinetic Power Generation by Means of Streaming Potentials: A Mobile-Ion-Drain Method to Increase the Streaming Potentials," Journal of Nanoscience and Nanotechnology, vol. 5, No. 4., pp. 648-652, (Apr. 2005).

Van Der Heyden et al., "Streaming Currents in a Single Nanofluidic Channel," Physical Review Letters, vol. 95, pp. 116104-1-116104-4, (2005).

Van Der Heyden et al., "Electrokinetic Energy Conversion Efficiency in Nanofluidic Channels," Nano Letters, vol. 6, No. 10, pp. 2232-2237, (2006).

Van Der Heyden et al., "Power Generation by Pressure-Driven Transport of Ions in Nanofluidic Channels," Nano Letters, vol. 7, No. 4, pp. 1022-1025, (2007).

Daiguji et al., "Electrochemomechanical Energy Conversion in Nanofluidic Channels," Nano Letters, vol. 4, No. 12, pp. 2315-2321, (2004).

Min et al., "On the Efficiency of electrokinetic pumping of liquids through nanoscale channels," Sensors and Actuators B: Chemical, vol. 98, No. 2-3, pp. 368-377, (Mar. 15, 2004).

* cited by examiner

METHOD AND APPARATUS FOR ELECTROKINETIC CO-GENERATION OF HYDROGEN AND ELECTRIC POWER FROM LIQUID WATER MICROJETS

CROSS-REFERENCE TO RELATED APPLICATIONS

This application claims priority to PCT Patent Application PCT/US2008/055924, filed Mar. 5, 2008, which application is incorporated herein by reference, and claims the benefit of priority to U.S. Provisional Patent Application Ser. No. 60/893,182 filed Mar. 6, 2007, entitled Apparati and Methods for Electrokinetic Hydrogen Generation.

STATEMENT OF GOVERNMENTAL SUPPORT

This invention was made with US Government support under Contract DE-AC0205CH11231 awarded by the United States Department of Energy to The Regents of the University of California for the management and operation of the Lawrence Berkeley National Laboratory, and Contract No. CHE-0404571 between the National Science Foundation and The Regents of the University of California. The US Government has certain rights in this invention.

BACKGROUND OF THE INVENTION

1. Field of Invention

This invention relates to the utilization of electrokinetic phenomena to produce hydrogen gas and to generate electrical power. More particularly, the invention relates both a method and apparatus for the generation of hydrogen gases by flowing a liquid such as water through one or more metal orifices under hydrostatic pressure to thereby form charged liquid microjets, which jets upon collision with a target acting as a source of electrons results in the production of hydrogen gas. Also, via the microjet formation process, a streaming current is produced which may be converted into useable electric power.

2. Description of the Related Art

The renewability, high energy conversion efficiency and non-polluting chemistry of hydrogen-based energy sources have long been known. However, a principal obstacle to implementing a widespread so-called hydrogen economy has been the high costs required for hydrogen production. There are many known methods for producing hydrogen. These methods can be classified into technologies such as biological, chemical, electrochemical and thermal. Each of these known methods is commercially restricted by cost, production rate limitations, or a combination of both.

Currently, commercial supplies of hydrogen are provided by steam reformation of natural gas or coal gasification. These are both thermal processes and are the cheapest methods available. However, these processes consume fossil fuel, and the quantities of hydrogen produced using these processes are not sufficient to initiate and sustain a widespread hydrogen economy. Electrochemical production of hydrogen is another known alternative that is quite advanced, but is a very expensive process.

The combination of declining petroleum reserves and increasing release of carbon, especially carbon dioxide, into the atmosphere necessitates serious efforts to develop renewable and non-polluting chemistry energy economies such as a hydrogen economy. However, there must be cost effective processes available and developed to produce sufficient quantities of hydrogen gas that is needed.

A substantial potential source of hydrogen is water, since it is widely available and an inexpensive commodity. Each water molecule is made of two hydrogen atoms and one oxygen atom. The challenge is that of efficiently separating the hydrogen atoms from the oxygen atoms at low cost and collecting the hydrogen atoms, or molecules formed from them.

Electrokinetic effects refer to electrical effects caused by the relative motion between a liquid, such as water, and a surface. It is well known that electrokinetic charge separation can be effected in a flowing liquid where some of the constituents of the liquid dissociate, forming positive and negative ions. Several researchers have recently explored this phenomenon as a vehicle for electric power development.

For example, in Canadian Patent 24367304, Apparatus and Method for Producing Electrical Energy from Fluid Energy, Kostiuk, et al describe a device which includes one or more electrically non-conductive fluid channels made, for example, from glass. Electrically conductive terminals closely positioned at each end of the channels so as to be in direct communication when fluid is within the channel(s) are electrically connected one to the other. When a fluid such as water is passed through the channel, electrical energy is produced. Noted as a product of the process was the ancillary formation of oxygen gas at one of the terminals and hydrogen gas at the other. Though suggesting one could recover $H_2$ or $O_2$ as desired, nothing is mentioned in the patent concerning the gas generating efficiency of the disclosed process. Additionally, in a related article, the principal researchers reported power generation efficiencies of less than 1% (Electrokinetic Power Generation by Means of Streaming Potentials: a Mobile-Ion-Drain Method to Increase the Streaming Potentials, J. Yang, F. Lu, L. W. Kostiuk and D. Y. Kwok, Journal of Nanoscience and Nanotechnology" Vol. 5, 648-652, 2005).

Heyden and Dekker et al. also explored this phenomenon as reported in *Streaming Currents in a Single Nanofluidic Channel*, Heyden, and Dekker, Physical Review Letters, PRL 95, 116104 (2005). Therein, the generation of electric current by flowing a pressure driven salt solution (such as KCl) through a rectangular silica nano-channel was described. In later articles *Electrokinetic Energy Conversion Efficiency in Nanofluidic Channels*, Heyden, Stein, and Dekker, Nano Letters, 2006, Vol. 6, No. 10, 2232-2237, and *Power Generation by Pressure-Driven Transport of Ions in Nanofluidic Channels*, Heyden, Stein, Meyer and Dekker, Nano Letters 2007, Vol. 7, No. 4, 1022-1025, efficiencies with a single, rectangular nanofluidic channel of up to 12% were estimated, but only about 3.2% realized using different salt solutions. In none of the Dekker articles is the generation of hydrogen gas reported.

What thus still remains is the need for an efficient electrokinetic apparatus and method for co-generating hydrogen gas, while at the same time generating larger streaming currents which may be converted into useful electrical energy.

SUMMARY OF THE INVENTION

By way of this invention a novel approach is taken to the generation of hydrogen gas, which method can also serve as a method for the generation of electrical power. By the co-generation methods and the apparatus of the invention, higher efficiencies have been achieved over those obtained in the prior art.

The methods of this invention exploit the electrokinetic charge separation phenomenon. The requisite apparatus is very simple and involves no moving parts. The input energy is a hydrostatic pressure source, and the hydrogen is produced by potential-driven reduction of water enriched in protons. Proton enriched water is obtained via the electrical charge separation effected by rapid flow of liquid water through a metal orifice. The electrokinetic charge separation process also generates electrical currents, which can be harnessed for, among other things, further electrochemical water splitting, and/or power generation.

It is believed that near the metal-water interface, selective adsorption of one type of charge carrier (hydroxide, in the case of pure water) to the metal nozzle surface creates a potential. At the shear plane, a short distance into the liquid, this potential is referred to as the zeta potential. To maintain charge neutrality, counter ions (hydrated protons in pure water) generate a diffuse layer of charge near the liquid-solid interface. The rapid flow of water through the metal nozzle sweeps away the diffuse, mobile layer, such that the emerging liquid water jet is positively charged via the unbalanced proton concentration.

In one embodiment, the diameter of the metal orifice can be on the order of about 5-20 micrometers (μm), more or less. The dimension of the orifice in the direction of fluid flow (i.e. aperture thickness) is generally between about 0.1 and 1.0 mm, but can be more. Due to the relatively short length of the orifice channel, aperture thickness is insufficient to develop either completely turbulent or laminar flow. Consequently, entrance effects dominate, engendering a "top hat" velocity profile. Thus, the fluid velocity at the water-metal interface is zero, with a laminar sub-layer near the wall. The fluid velocity increases linearly across this laminar sub layer until it reaches bulk fluid velocity.

The flow of fluid through the orifice produces an electrically charged liquid water microjet. Hydrogen may be generated when the positively charged liquid microjet strikes a downstream grounded metal target. Also produced is a streaming current.

The apparatus for the co-production of hydrogen and electric power comprises a fluid source, or reservoir, means for applying a hydrostatic pressure to the fluid source, means for transport of said fluid source to an electrically isolated microjet nozzle, wherein liquid is forced through a small (microscale) orifice under pressure to form a liquid microjet, which microjet breaks up into a droplet stream, and a downstream target spaced from said microjet nozzle a distance sufficient to insure that at the time of arrival, the liquid microjet has broken up into discreet droplets. In one embodiment, a collector vessel is provided to capture hydrogen gas produced at said target. In another embodiment the electrically isolated nozzle is electrically connected to the target, whereby when fluid flows through the apparatus, a current is generated. In one embodiment, the apparatus includes but a single microjet nozzle. In another embodiment the apparatus includes multiple microjet nozzles. In yet another embodiment, a plurality of multi jet apparati can be combined to scale up the hydrogen gas/electrical power co-generation capabilities of the system.

The method of this invention for producing hydrogen more broadly includes the steps of: a) providing a source liquid containing hydrogen cations; b) providing a velocity to the source liquid relative to a solid material to form a charged liquid stream, the solid material forming a liquid-solid interface; and c) supplying electrons to the charged liquid stream by contacting the charged liquid with an electron source to thereby form hydrogen gas.

The liquid-solid interface may in one embodiment comprise one or more metals from the group comprising platinum, and iridium, or alloys of these metals. Both metals are known to produce high zeta potentials when tested with water. Other metals, or metal alloys, such as molybdenum, copper, silver, gold, iron, aluminum, nickel, and the like, may be used. Due to the cost of platinum and iridium, these may be used as thin coatings on cheaper bulk materials, such as aluminum or steel. In the water environment, stainless steel can be a preferred bulk material, with the costly platinum or iridium vapor deposited or electroplated for contact with a stream of water, or other fluid, to cause charge separation.

BRIEF DESCRIPTION OF THE DRAWINGS

So that the above-recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the invention are described herein in the context of several apparati and methods for electrokinetic hydrogen generation. Those of ordinary skill in the art will realize that the following detailed descriptions of the invention are illustrative only and are not intended to be in any way limiting. Other embodiments of the invention will readily suggest themselves to such skilled persons having the benefit of this disclosure. Reference will now be made in detail to implementations of the invention as illustrated in the accompanying drawings. The same reference indicators will be used throughout the drawings and the following detailed descriptions to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Hydrogen Generation

Figure 1A:
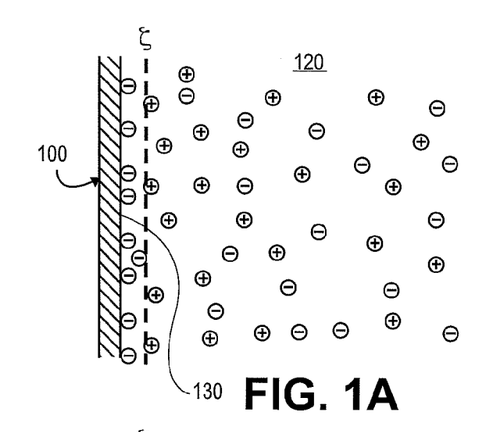
FIGS. 1A and 1B illustrate preferential charge carrier adsorption to a surface, FIG. 1B also illustrating fluid flowing relative to such surface, with arrow height indicating positional velocity. The approximate position of the plane of shear is marked with a dashed line.
Figure 1B:
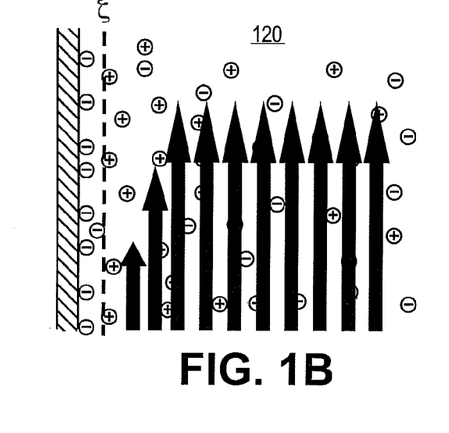
Figure 1C:
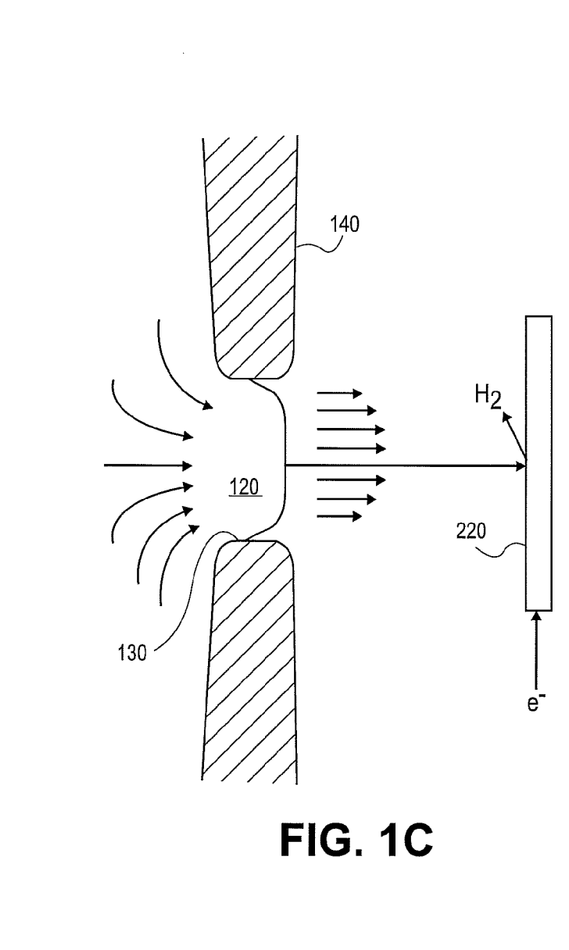
FIG. 1C illustrates the flow of fluid through a nozzle opening.

Referring now to FIG. 1A, illustrated is a schematic of a fluid 120 interacting with a solid 100, with the solid 100 partially shown. In FIG. 1B, fluid 120 flows over the solid 100 at the liquid-solid interface 130. As illustrated, fluid flow is shown unconstrained. However, where solid 100 represents the one wall of an orifice 140, the flow will be symmetrical through the orifice as illustrated in FIG. 1 C, the flow being of zero velocity at the liquid-solid interface 130, increasing from zero velocity to the maximum fluid velocity towards the center of flow.

Figure 2A:
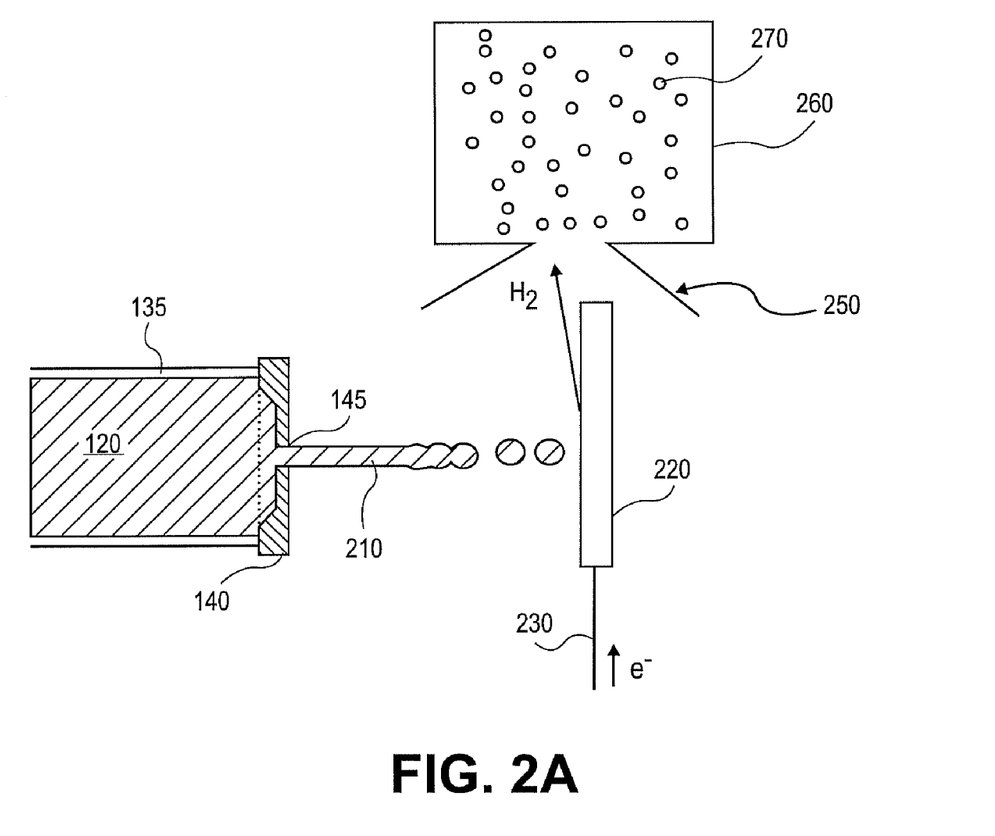
FIG. 2A illustrates an overall system according to this invention for the electrokinetic generation of hydrogen.

Referring now to FIG. 2A, a complete system for the electrokinetic generation of hydrogen is illustrated. Here, pressurized fluid 120 is directed through capillary tube/conduit 135 to the input side of nozzle 140. Charged liquid spray stream 210 is generated as the fluid passes through and exits the nozzle. This charged liquid stream 210 contains hydrated protons of the chemical structure $H^+(H_2O)n$, also referred to as hydronium, the stream breaking up into a droplet spray downstream from the nozzle. Target 220 receives a flow of electrons 230 to neutralize charged liquid droplet stream 210, evolving hydrogen gas in the process. The electron source may be either a battery, an electrical connection to the liquid-metal interface of the nozzle, or ground.

The hydrogen is collected as it diffuses to a collection system 250, where it may be stored in storage container 260, which in one embodiment may include a hydrogen sorbent material 270. Alternatively, and not shown, the hydrogen gas may be pumped into a pressurized storage container.

The liquid from conduit 135 passes through orifice 145 of nozzle 140 (which may be electrically grounded), the electrically charged liquid microjet stream 210 emerging at speeds (depending upon pressure) of from 1 m/s to about 500 m/s (with speeds of about 100 meters per second (m/s) or thereabouts typical of the jet streams generated in the experimental work). The liquid microjet 210 enters a containment chamber (not shown) which may be maintained at above, below, or at atmospheric pressure, the pressure in the chamber not being particularly critical to the operation of the system.

Charging of the liquid microjet may be optimized by proper selection of orifice diameter, shape (such as circular, oval, rectangular or slit like), and jet channel length. The orifice may have a diameter of between 0.5 μm to 100 μm and in one embodiment is between 5-20 μm. The channel length may be between 0.1 mm-1.00 mm, though it can be as much as 5 mm, or more. Technically there is no real limit to how thick the channel may be. Suitable hydrostatic pressures for the microjets utilized herein range from >0 MPa and 500 MPa<, and more preferably range between 1 MPa and 50 MPa. By adjusting the pressure at which the flowing liquid contacts the orifice, both liquid jet charging and the liquid jet output length may be changed.

Figure 3A:
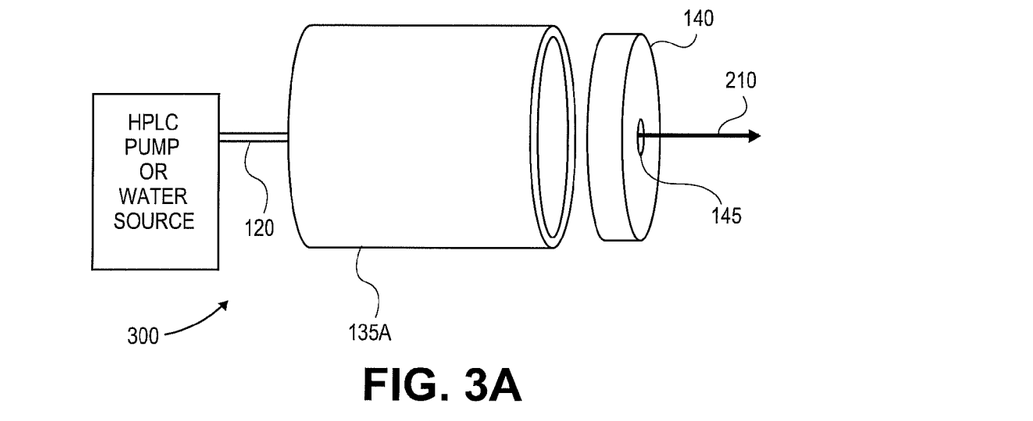
FIGS. 3A, 3B, and 3C illustrate a portion of the system according to the instant invention for the electrokinetic generation of hydrogen by the flowing of a fluid through one or more microjet orifices.

Further detail is illustrated in FIG. 3A for a single orifice apparatus 300 for electrokinetic hydrogen generation and electrical power generation. Here, an orifice plate 140 is provided with a single orifice 145, where the orifice surface 130 may be coated with platinum, iridium, or other high zeta potential material. The pressurized fluid stream 120 may be passively or actively pressurized, such as by the hydrostatic head of an elevated fluid reservoir (relative to the nozzle), or a pump. If the fluid is water and the solid is a metal, the partially dissociated charged liquid steam 210 will contain hydrated protons $H^+(H_2O)n$. An electron source (not shown) supplies electrons to the hydrated protons $H^+(H_2O)n$ to evolve hydrogen according to the reduction reaction: $2H_3O^+ + 2e^- \rightarrow 2H_2O + H_2$. At the nozzle, oxygen is also generated by the oxidation of hydroxyl radicals according to the reaction: $2OH^- \rightarrow \frac{1}{2}O_2 + H_2O + 2e^-$.

Figure 2B:
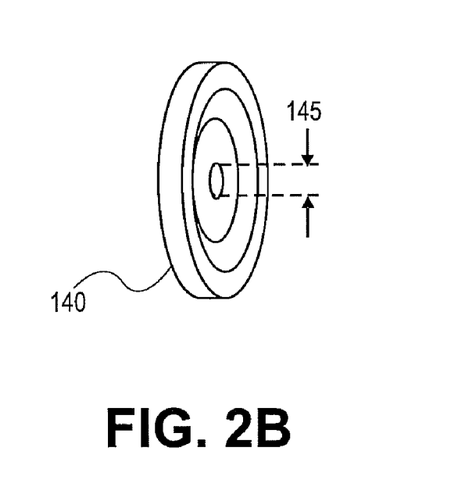
FIG. 2B is a rotated detail of the microjet nozzle of FIG. 2A.
Figure 3B:
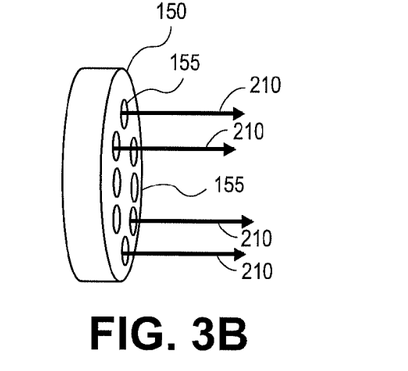

Referring now to FIG. 3B, an example of an orifice plate 150 is illustrated, which plate may be interchangeable with plate 140, plate 150 comprising a plurality of individual orifices 155, each orifice of similar design to the single orifice 145 of plate 140. Orifice plate 150 may also be formed from a mesh, or a grid structure, the critical requirement being that a charged liquid is produced after passage through the orifice. As illustrated in FIGS. 2A and 2B, the nozzle may be dish shaped (available commercially), or comprise a small borehole drilled through or otherwise formed in a disk of the type illustrated in FIG. 3. Attached to the end of conduit 135, in the case of the dish shaped nozzle, the dished face may be positioned either facing upstream, as shown in FIG. 2A, or downstream as shown in FIG. 2B, the orientation not of particular criticality.

The liquid, directed from conduit 135A to the plurality of orifices 155 of metal plate 150 creates multiple liquid microjets 210. By way of an illustrative embodiment, where the liquid is pressurized to about 4 MPa or greater, the microjet stream as it emerges from the nozzle will have a velocity of about 50 meters per second (m/s), more or less. Though FIG. 3B depicts a simple plurality of microjet orifices, the number of orifices is not intended to be limiting, such that nozzles having a far greater numbers of orifices may be used herein, and multiple bundles of such multi orifice nozzles may be employed in the construction of a hydrogen/current generation device according to this invention, such that the total number of orifices in a given system may approach $10^6$ or more.

Figure 3C:
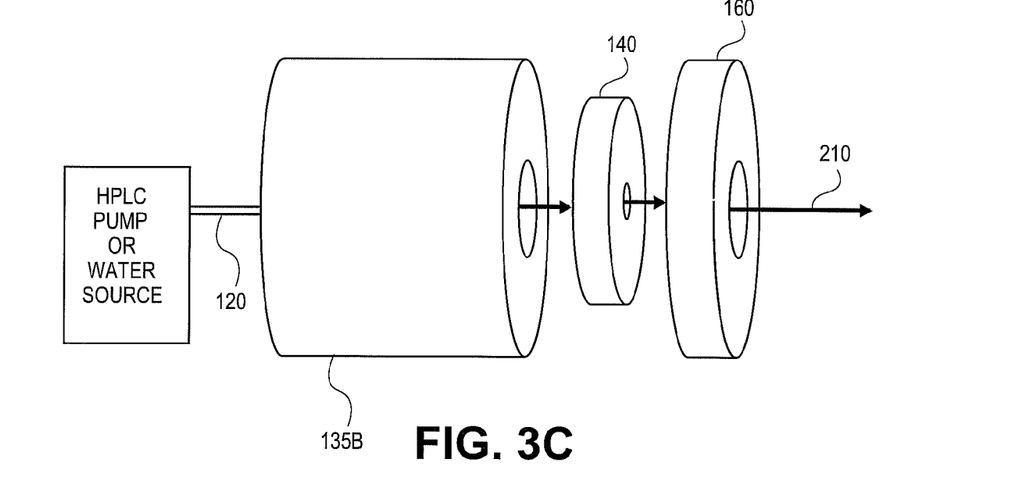

As shown in FIGS. 3A and 3C, the orifice plate may be bolted via plate 160 to or otherwise fastened to conduit 135, and can be electrically isolated by interposition of a non-conductive material such as a Teflon washer, etc. The conduit itself can be of any internal diameter (two such possible variations illustrated as items 135A and 135B in FIGS. 3A and 3C), so long as it has sufficient capacity to allow for an adequate flow of fluid, and should present a suitable mounting surface for securing the nozzle plate.

The plate used for the nozzles may be made of any metal or a combination of metals with high electrokinetic potential (or zeta potential) for water, such as platinum and iridium, or a combination of these two metals. Such materials yield high values for a set of electric potentials that accompany relative motion between the solid and liquids.

The magnitude of the zeta potential is important for determining the degree of electrical charging of the microjets. In general, any contact between two materials with different chemical potentials (i.e. work functions) will produce charge transfer from one to the other until equilibrium is reached and the chemical potentials become equal. Exemplary metals, in addition to platinum or iridium, which can be used for the nozzle, or at least to form the inside wall of the nozzle include molybdenum, copper, silver, gold, iron, aluminum, and nickel, as well as possibly silicon and germanium.

The electrically charged liquid jet output(s) 210 enter a chamber (not shown) where hydrogen production is effected by interaction of the charged microjet(s) with the metal target electrode 220, which target is held at electrical ground, or in contact with the nozzle or other electron source, wherein production may be optimized by, among other things, utilizing the proper orifice diameters and liquid jet channel lengths. The target 220 is formed from copper in one embodiment, but may be formed from other conductors such as molybdenum, silver, gold, iron, aluminum, nickel, platinum, iridium, etc., and possibly such semiconductors as silicon and germanium.

The target is positioned a distance from the exit of the nozzle sufficient such that the jet stream brakes up into a discontinuous stream, that is, into discrete droplets before impinging upon the target. In the case of hydrogen generation, where in one embodiment the process was run in vacuum, the target was placed about a meter from the microjet orifice. In the experiment described below in connection with electrical power generation, the target was positioned about 5 cm from the microjet orifice. It has been observed that the jet stream begins to break up soon after it leaves the nozzle, and most commonly breaks up within about 1-5 cm from the nozzle exit. Thus, in the case of power generation, the target can be positioned but a few to ten centimeters from the nozzle. Generally, the target can be positioned at any distance beyond which the jet stream becomes discontinuous; although the closer the target is placed to the jet nozzle, the smaller the overall size of the device.

The target electrode at which hydrogen gas is produced can be provided with a liquid trap to collect excess liquids. Once the liquid exits orifice 145, the trap may collect any water and/or condensable electrokinetic produced products. The trap may be a cryotrap, such as a liquid nitrogen trap.

Typically, the microjet assembly can be contained within a housing, not shown, which is used to contain the liquid flow as it reaches and then moves off the target. The vessel 250 for collecting the hydrogen gas is contained within the housing, the housing itself maintained at a pressure of from anywhere between >0 Torr and 1500 Torr, with the pressure preferably maintained within the more narrow range of 0.1 Torr and 760 Torr. Notably, for electrical power generation, the pressure within the housing in one embodiment can be maintained at one atmosphere.

Figure 4A:
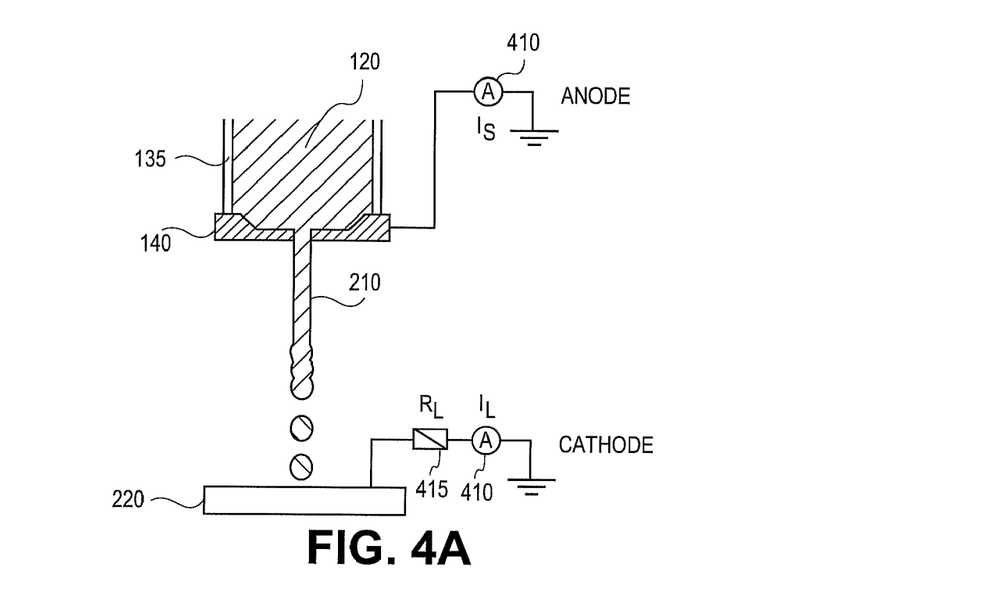
FIGS. 4A and 4B illustrate systems according to the instant invention that use the process of electrokinetic generation of hydrogen to additionally generate usable electrical power.
Figure 4B:
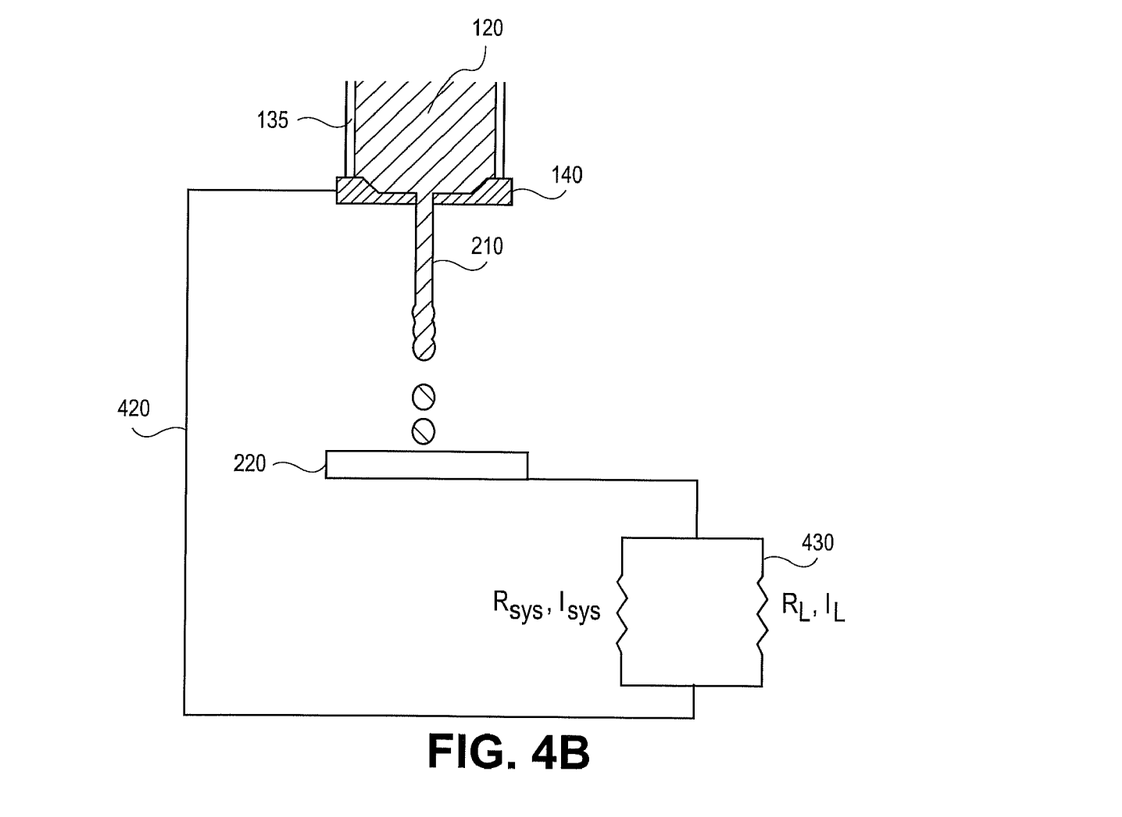
Figure 5:
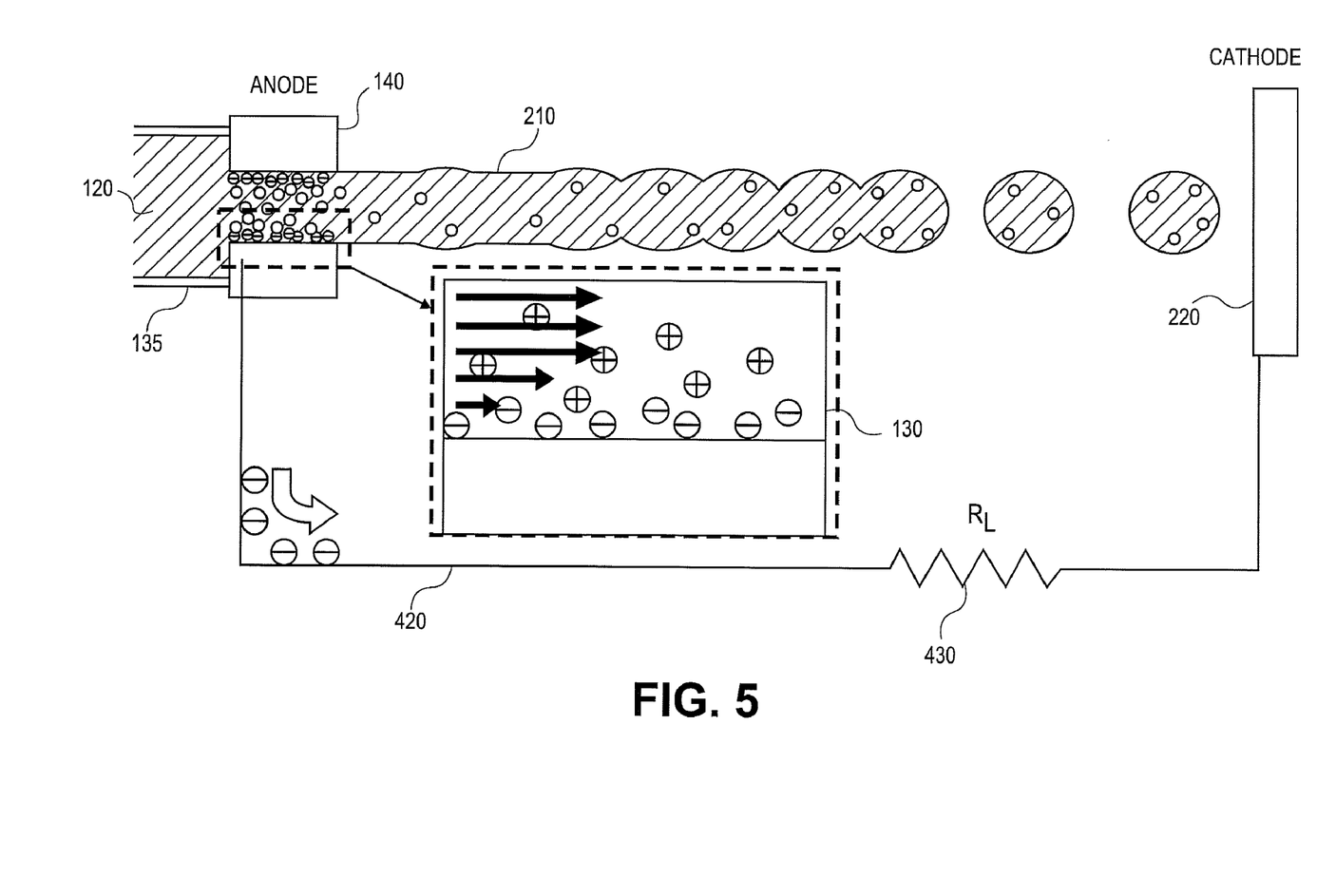
FIG. 5 is an enlarged illustration of an apparatus similar to that of FIG. 4B according to the instant invention useful for the generation of electrical power.

The orientation of the microjet assembly is likewise not critical. That is, it may be set up in a horizontal alignment, such as illustrated in FIGS. 2, and 5, or in a vertical alignment, with the microjet nozzle above, and the target positioned a distance below, as illustrated in FIGS. 4A and 4B. In experimental work conducted so far, the microjet assembly has been set up in both alignments. Notably, when positioned vertically, no significant defection of the jet stream was observed, even when the target was positioned a meter away (for a system at vacuum). In atmospheric pressure experiments for power generation, when the target was placed several centimeters distant, the spray neither significantly deflected nor dissipated as a mist before striking the target.

Electrical Power Generation

As previously noted, the method and apparatus of this invention concurrently produces a streaming current which may be converted into useful electrical energy, Various arrangements for harvesting this energy are shown in FIGS. 4A, 4B, and FIG. 5. In FIG. 4A, with the nozzle 140 deployed vertically, face down, the presence of a current $I_s$ generated at the nozzle is measured by ammeter 410, the nozzle being connected to ground through the ammeter. The current generated at target 220, connected to ground via variable resistor 415 is designated as $I_L$, and likewise can be measured using a similar ammeter.

When there is no added resistance in the target circuit, the current measured at the target is always equal in magnitude and opposite in sign to the current at the nozzle. That is, when $R_L=0$, $I_s=I_L$. For a given aperture and flow rate, the nozzle current or the current at the target at zero resistance represents the maximum amount of charge available for energy conversion. As the resistance between the target and the electrical ground increases, the target current decreases and the voltage at the target increases.

FIG. 4B shows another circuit arrangement whereby nozzle 140 is electrically connected via wire 420 to target 220 through load resistor 430, the nozzle serving as a source of target electrons. Also illustrated is the dissipation path in terms of a system resistance, $R_{sys}$, and current, $I_{sys}$. Here, $I_L$ and $R_L$ are the current and resistance through the load resistor used to calculate conversion power and efficiency, while $I_{sys}$ and $R_{sys}$ are the current and resistance associated with system losses, represented in FIG. 4B as another resistor in parallel with the load resistor. To maintain charge neutrality, the system current $I_{sys}$ and load current, $I_L$, must sum to the nozzle current, $I_L+I_{sys}=I_s$.

Figure 6A:
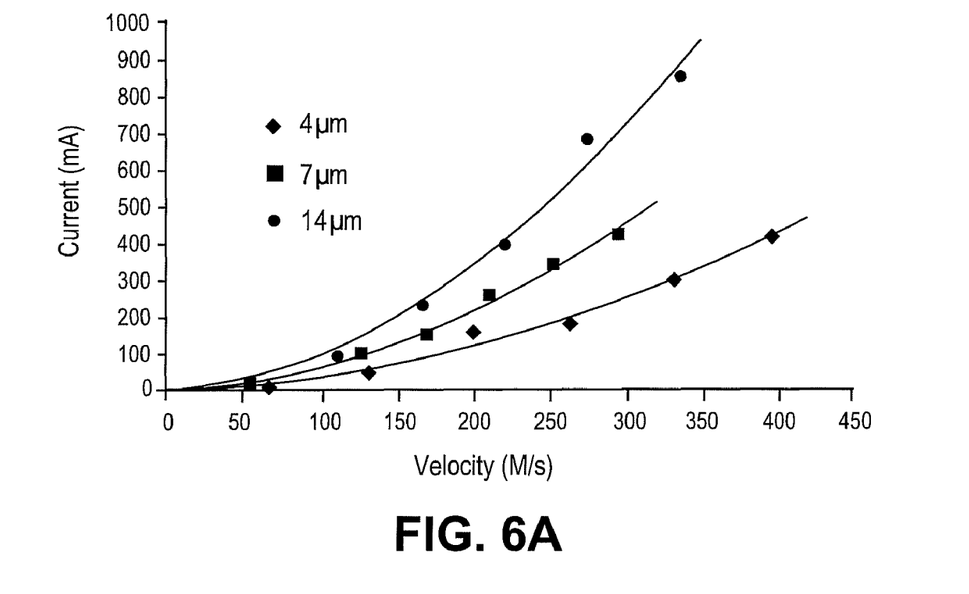
FIGS. 6A and 6B are plots of experimental results illustrating the effect of nozzle size and jet velocity on current generation as well as power production and energy conversion efficiency.
Figure 6B:
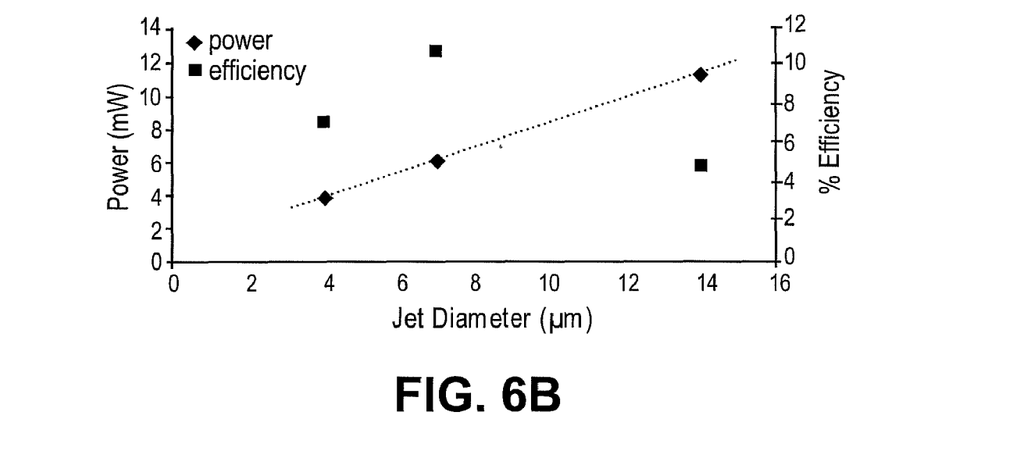

Using the apparatus of FIG. 4A, a series of experiments were conducted to determine what factors most affect power generation efficiencies. The components are labeled with the same numbering conventions as used in FIGS. 1 and 3. Results are shown in FIGS. 6A and 6B.

Liquid water microjets were created by pressurizing water behind a thin metal orifice. The jet orifice was a Pt-Ir electron microscope aperture (Ted Pella Inc.) pressed between two stainless steel plates. Clean water (18.2 M Ohm cm, Millipore Milli-Q filtered) was nitrogen-purged and vacuum degassed prior to being pressurized and forced through the aperture with a Jasco PU-2089 HPLC (High Performance Liquid Chromatography) pump. Jet velocity was controlled by changing the volumetric flow rate at the pump.

Streaming currents were measured at both the jet nozzle and the downstream (approximately 5 cm) copper plate that served as the jet target. At the nozzle, the current $I_s$ was fed into a Keithley 428 current amplifier and the resulting signals recorded by a computer. Current at the target $I_L$ was recorded in the same manner, with the addition of a variable resistor 415, $R_L$ (0-200 G ohms) before the amplifier. Both the nozzle and target were insulated from all other electrical contacts with protective Teflon sheets. For efficiency calculations, the backing pressure and volumetric flow rate from the pump were also recorded as the resistance was stepped from 0 to 200 Gohms in steps of 10 Gohms. The process was repeated at a variety of flow rates and for three different aperture diameters, the orifice thickness being held constant. After a series of measurements, the apertures were sized using a light microscope and a calibration curve created from measuring capillary tubing of known internal diameter. The apertures used in the experiments measured 4±1 μm, 7±1 μm, and 14±1 μm, with the uncertainty matching the diameter tolerances from the manufacture. FIG. 6A plots the streaming current data measured at the nozzle for each aperture size.

Demonstrated is a clear increase in magnitude of the streaming current as a function of jet nozzle orifice diameter. This increase is proportional to the increase in the metal-water interfacial surface area, i.e. aperture circumference as all the apertures are of the same thickness. The solid lines in FIG. 6A are the best fits of the data to the below developed equation, predictive of streaming current [the derivation of this equation discussed in the referenced draft prepublication paper cited at Paragraph 0057]:

$$I_s = \frac{-2\pi R \varepsilon \bar{v} \zeta}{\delta x}$$

where $\bar{v}$ is the average fluid velocity, $\delta x$ is a measure of the laminar sublayer thickness ($\delta x = 116 \cdot R \cdot R_e^{(-7/8)}$), $\varepsilon$ is the permittivity of the medium times the permittivity of free space, and ζ is the potential at the shear plane. $R_e$ is the Reynolds number frequently used in fluid mechanics.

FIG. 6B plots both peak power and efficiency for the three jet diameters measured. Generally, the power production increased with aperture size and the highest power was realized with the 14 μm diameter jet. However, the greatest efficiency was realized with the 7 μm diameter jet and was lower for the other apertures. Interestingly, despite the fact that the peak values were found at a different velocities and load resistances, peak power shows a direct increase with jet diameter ($R^2$=0.9999). Thus, it appears the maximum power obtainable for an aperture is directly related to the metal-water interfacial surface area. However, increases in channel diameter necessitate increases in flow rate that scale with the open aperture area (area∝$diameter^2$). Consequently, the larger diameter apertures require inordinately larger flow rates to maintain the same velocity. This leads to a decrease in efficiency, as a larger fraction of the hydrodynamic driving power is "wasted". Accordingly, peak efficiency increases with peak power when going from the 4 μm jet to the 7 μm jet, but decreases upon moving to the 14 μm jet.

For the limited number of jet diameters measured, a maximum efficiency of 10.7% was obtained for the 7 μm diameter. However, the power at the target represents only half of the available energy. The metal nozzle yields a current that is always equal in magnitude and opposite in sign to the current at the downstream target. Thus, the efficiency can be doubled to over 21% by utilizing both the upstream and downstream currents. In addition, further increases in efficiency may be realized by maximizing surface area at the expense of cross sectional area, i.e. by using rectangular jets. Moreover, the liquid jet retains considerable kinetic energy with jet velocities at ~30 to 400 m/s. This kinetic energy could be converted to electricity using a small scale but conventional turbine generator.

Finally, to increase output the liquid source can be fed to a number of microjet bundles which can be directed to one or more targets. The number of microjet bundles which can be combined into a single generating apparatus is limited primarily by size constraints in the case of systems intended for portability. Otherwise, there is no theoretical limit to the number of microjets or microjet channel bundles that can be combined to produce hydrogen and electric power.

Notwithstanding calculations predicting efficiencies as high as 12%-15% [van der Heyden, F. H. J.; Bonthuis, D. J.; Stein, D.; Meyer, C.; Dekker, C. Nano Letters 2006, 6, 2232-2237; Daiguji, H.; Yang, P. D.; Szeri, A. J.; Majumdar, A. Nano Letters 2004, 4, 2315-2321; and Min, J. Y.; Hasselbrink, E. F.; Kim, S. J. Sensors and Actuators B-Chemical 2004, 98, 368-377] experiments by van der Heyden, et. al. have thus far only achieved efficiencies of but 3.2% for a single nano-channel [van der Heyden, F. H. J.; Bonthuis, D. J.; Stein, D.; Meyer, C.; Dekker, C. Nano Letters 2007, 7, 1022-10250], and Yang et al [Yang, J.; Lu, F. Z.; Kostiuk, L. W.; Kwok, D. Y. Journal of Nanoscience and Nanotechnology 2005, 5, 648-652] achieved efficiencies of only 0.80% for a porous glass plug.

Without intending to be bound by the following theory, it is believed that back conduction of charge through the bulk liquid and along the surface existing in the reported approaches of the above cited prior art provide additional routes for dissipating of charges with an attendant reduction in conversion efficiency. Electrokinetic power generation using the liquid water microjets of this invention overcomes this by eliminating surface and bulk back-conduction via creation of a jet of water that breaks up into a discontinuous droplet spay before reaching the receiving reservoir, thereby terminating such undesired paths for loss of charge. Under these conditions, accumulated charge can only dissipate through the load resistor and efficiency is dramatically increased. In addition, the thin metal jet orifice creates flow conditions wherein it is believed entrance effects dominate and, consequently, the streaming current increases nearly quadratically with flow rate.

INCORPORATION BY REFERENCE

The papers entitled *Electrokinetic Hydrogen Generation from Liquid Water Microjets*, Duffin and Saykally, Journal Phys. Chem. C 2007, 111, 12031-12037 (Jul. 20, 2007), and the prepublication draft of the paper entitled *Electrokinetic Power Generation from Liquid Water Microjets*, Duffin and Saykally, 10 pages, [now published in J. Phys. Chem. C 2008, 112, 17018-17020] are attached hereto and are incorporated herein by reference as if fully set out in their entirety It is to be appreciated that various modifications and additions to the invention as described may be made without departing from the spirit thereof. For example, the materials of the nozzle and the target could be changed such that hydrogen is generated at the nozzle and oxygen at the target. By way of a second example, should the housing be maintained at a vacuum, the target could be equipped with a heater so as to prevent the formation of ice during system operation. Still further, the diameter of the nozzle openings is not critical and in one embodiment could be nano-sized, that is, well less than one micron in diameter, thus producing a liquid nanojet.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What we claim is:

1. A method for generation of both hydrogen gas and electrical power comprising:
   a) providing a source of pressurized liquid;
   b) directing said pressurized liquid to a nozzle;
   c) generating a liquid stream containing hydrated protons by passing such pressurized fluid through said nozzle, the liquid stream becoming discontinuous downstream of the nozzle;
   d) directing said discontinuous liquid stream to a target, said target acting as a source of electrons; and,
   e) thereafter generating hydrogen gas by the reduction reaction of said hydrated protons by the said electrons at the said target.

2. The method of claim 1 wherein the liquid is water.

3. The method of claim 1 wherein the nozzle is a microjet nozzle.

4. The method of claim 1 wherein the nozzle is a metal nozzle.

5. The method of claim 1 wherein the target is connected to ground, whereby a current from the target to ground is generated.

6. The method of claim 1 wherein the nozzle is connected to ground, whereby a current from the nozzle to ground is generated.

7. The method of claim 1 wherein the nozzle is electrically connected to the target, whereby a current is generated flowing between the nozzle and the target.

8. An apparatus for the generation of hydrogen gas and electrical power including:
   a) a liquid reservoir
   b) a means for pressurizing liquid contained in said reservoir to form a pressurized liquid;
   c) a nozzle having at least one opening to receive said pressurized liquid, said nozzle being configured and dimensioned to convert said pressurized liquid to an electrically charged droplet spray;
   d) a conduit for connecting said liquid reservoir to said nozzle; and,
   e) a target spaced downstream a predetermined distance from said nozzle, wherein said electrically charged droplet spray generated by said nozzle strikes said target to generate said hydrogen gas.

9. The apparatus of claim 8 wherein the nozzle is a metal nozzle.

10. The apparatus of claim 8 wherein the nozzle is electrically isolated from the rest of the apparatus.

11. The apparatus of claim 8 wherein the nozzle is electrically connected to ground.

12. The apparatus of claim 8 wherein the nozzle is a microjet nozzle.

13. The apparatus of claim 8 wherein the channel length of said nozzle is between 0.1 mm and 5 mm.

14. The apparatus of claim 8 wherein the target is spaced a distance from said nozzle such that a jet stream created by said nozzle becomes a discontinuous droplet spray by the time it reaches said target.

15. The apparatus of claim 8 wherein the target is electrically connected to ground.

16. The apparatus of claim 8 wherein the nozzle is electrically connected to the target.

17. The apparatus of claim 16 wherein the nozzle is oriented in a vertical position, above the target.

18. The apparatus of claim 16 further including a resistor in the line between the nozzle and the target.

19. The apparatus of claim 8 wherein the nozzle includes a platinum metal.

20. The apparatus of claim 8 including a source of electrons at the target.

21. The apparatus of claim 8 wherein the source of electrons is ground.

22. The apparatus of claim 8 wherein the source of electrons a current from the nozzle.

23. The apparatus of claim 8 further including a housing which encloses said nozzle and said target.

24. The apparatus of claim 23 further including means contained within said housing for collecting hydrogen generated by the flow of liquid through said nozzle.

25. A method for producing hydrogen, comprising: a) providing a source liquid; b) providing a velocity to the source liquid relative to a solid material to form a charged liquid stream, the solid material having a liquid-solid interface; c) supplying electrons to the charged liquid stream by contacting the charged liquid stream with an electron source, wherein the electron source is a liquid; d) thereby forming hydrogen gas.

26. The method of claim 25 for producing hydrogen, wherein the solid material liquid-solid interface has a sufficiently high zeta potential to dissociate hydrogen from the source liquid.

27. The method of claim 26 for producing hydrogen, wherein the electron source supplies electrons from the solid material.

28. The method of claim 26 for producing hydrogen, wherein the electron source supplies electrons from ground.

29. The method of claim 26 for producing hydrogen, wherein the charged liquid stream is a spray.

30. The method of claim 25 for producing hydrogen, wherein the source liquid is water.

31. The method of claim 25 for producing hydrogen, wherein the electron source is a metal.

32. The method of claim 31 for producing hydrogen, wherein the liquid-solid interface comprises one or more of the group consisting of: a) platinum, b) iridium; c) a metal coated at least in part with platinum and/or iridium.

33. A method for producing hydrogen, comprising: a) providing a source liquid; b) providing a velocity to the source liquid relative to a solid material to form a charged liquid stream, the solid material having a liquid-solid interface, wherein the interface has a sufficiently high zeta potential to dissociate hydrogen from the source liquid, wherein the liquid-solid interface comprises an orifice with a diameter of 100 microns or less; c) supplying electrons to the charged liquid stream by contacting the charged liquid stream with an electron source; d) thereby forming hydrogen gas.

* * * * *